United States Patent
Ramaswamy

(10) Patent No.: US 7,043,731 B2
(45) Date of Patent: May 9, 2006

(54) METHOD AND SYSTEM FOR DISTRIBUTING ACCESS TO GROUP OF OBJECTS BASED ON ROUND ROBIN ALGORITHM AND ONLY WHEN THE OBJECT IS AVAILABLE

(75) Inventor: Suresh Ramaswamy, Broomfield, CO (US)

(73) Assignee: Qwest Communications International, Inc., Denver, CO (US)

( * ) Notice: Subject to any disclaimer, the term of this patent is extended or adjusted under 35 U.S.C. 154(b) by 749 days.

(21) Appl. No.: 09/905,384

(22) Filed: Jul. 12, 2001

(65) Prior Publication Data

US 2003/0014469 A1 Jan. 16, 2003

(51) Int. Cl.
*G06F 9/46* (2006.01)

(52) U.S. Cl. ............... 718/105; 719/316; 709/201
(58) Field of Classification Search ............... 718/100, 718/102, 104, 105; 719/316; 709/201
See application file for complete search history.

(56) References Cited

U.S. PATENT DOCUMENTS

| 5,903,725 | A | * | 5/1999 | Colyer ................. 709/203 |
|---|---|---|---|---|
| 6,014,700 | A | * | 1/2000 | Bainbridge et al. ...... 709/226 |
| 6,018,805 | A | * | 1/2000 | Ma et al. ................ 714/4 |
| 6,125,363 | A | * | 9/2000 | Buzzeo et al. .......... 707/100 |
| 6,324,580 | B1 | * | 11/2001 | Jindal et al. .......... 709/228 |
| 6,457,065 | B1 | * | 9/2002 | Rich et al. ............ 719/328 |
| 6,519,652 | B1 | * | 2/2003 | Sadiq ................... 719/316 |
| 6,629,128 | B1 | * | 9/2003 | Glass ................... 709/203 |
| 6,691,148 | B1 | * | 2/2004 | Zinky et al. ........... 709/201 |
| 6,704,692 | B1 | * | 3/2004 | Banerjee et al. ........ 702/189 |
| 6,751,646 | B1 | * | 6/2004 | Chow et al. ........... 718/105 |
| 2002/0095454 | A1 | * | 7/2002 | Reed et al. ............ 709/201 |
| 2002/0099970 | A1 | * | 7/2002 | Zhao et al. ............ 714/4 |
| 2002/0152145 | A1 | * | 10/2002 | Wanta et al. ........... 705/35 |
| 2002/0152307 | A1 | * | 10/2002 | Doyle et al. .......... 709/225 |
| 2002/0156931 | A1 | * | 10/2002 | Riedel ................. 709/313 |
| 2003/0018766 | A1 | * | 1/2003 | Duvvuru ............... 709/223 |
| 2003/0069968 | A1 | * | 4/2003 | O'Neil et al. ......... 709/225 |
| 2003/0105735 | A1 | * | 6/2003 | Kukura et al. ......... 707/1 |
| 2003/0225693 | A1 | * | 12/2003 | Ballard et al. ........ 705/42 |
| 2004/0019898 | A1 | * | 1/2004 | Frey et al. ........... 719/330 |
| 2004/0022237 | A1 | * | 2/2004 | Elliott et al. ........ 370/356 |

\* cited by examiner

*Primary Examiner*—Meng-Al T. An
*Assistant Examiner*—Lilian Vo
(74) *Attorney, Agent, or Firm*—Townsend and Townsend and Crew LLP

(57) ABSTRACT

Object distribution systems and methods for controlling load distribution during access to objects resident on a plurality of computers attached to a communication network. Systems comprise client and server computers attached to a communication network. Client programs are resident on the client computer and objects are resident on the servers. Various objects are grouped together with other objects that perform similar functions into an object group. The methods involve receiving a request for a function performed by objects within the object group, using a distributor to select between the various objects within the object group, and providing a reference to the selected object to the client program.

19 Claims, 7 Drawing Sheets

METHOD AND SYSTEM FOR DISTRIBUTING ACCESS TO GROUP OF OBJECTS BASED ON ROUND ROBIN ALGORITHM AND ONLY WHEN THE OBJECT IS AVAILABLE

BACKGROUND OF THE INVENTION

This invention relates in general to systems and methods for distributing and accessing replicated services across a computer network. More specifically, this invention relates to computer environment constructs and methods of using such which allow for calling and executing computer objects distributed across a network in a way that distributes work across the network and/or across the objects.

Common Object Request Broker Architecture (CORBA) is a standard from the Object Management Group (OMG) for communicating between self-contained software modules which are distributed across a computer network. Such software modules are commonly referred to as objects. CORBA provides a software based mechanism for locating and accessing objects in a computer network. The basic function of CORBA involves a client program calling another program to perform a function supported by the called program, regardless of where the called program is located on a computer network.

Objects useful in relation to CORBA are defined by an Interface Definition Language (IDL) that describes the methods, or processes, that an object performs and the format of any data provided to or from the object. Such objects can be written in a variety of computer languages and executed by a variety of operating systems. By using an IDL common to two or more objects that provide similar functionality, any of the objects can be accessed to perform the supported function regardless of the language used to implement a particular object or even the platform executing the object. This allows access to objects from any portion of a computer network.

In operation, a client makes requests to a remote object supporting a CORBA IDL via an Object Request Broker (ORB). The ORB provides a proxy object in the client's address space, which creates an illusion that the remote object is local to the client. When the client calls a function of the object, the ORB sends a message to a server where the object is resident. The function is performed on the server and the results of the function are returned to the ORB. The ORB then converts the results to an object reply expected by the client.

Each server supporting CORBA compliant objects advertises the availability of such objects to the network through use of a naming service. Thus, by querying the naming service, a client can determine where on the network a particular CORBA compliant object resides. When a particular object is identified, its object reference can be requested by the client. While this operation allows for accessing objects across a network, it does not provide for distributing operational loads across the network and/or the objects. Furthermore, it does not provide fault tolerance in a way which maintains a distributed load.

Additional deficiencies in the prior art, and improvements in the present invention, are described below and will be recognized by those of ordinary skill in the art.

BRIEF SUMMARY OF THE INVENTION

This invention provides systems and methods for distributing and accessing replicated services across a computer network. In particular, this invention relates to accessing and distributing objects across a computer network. The distribution is provided in a way that work performed by individual objects and/or servers on a network is evenly distributed.

The invention provides many advantages including, for example, uniform load distribution across servers and/or objects. Such load distribution can include both coarse and fine grain load balancing. In addition, some embodiments include local caching of object references which provides for increased performance. Beyond increased performance, such caching can provide for fault tolerance. For example, in some embodiments, the caching functionality includes a periodic check of objects referenced from the cache to assure the objects are operational and available. Objects which are determined to be non-available are removed from the cache and no longer distributed. Such a dynamic approach to object distribution avoids reference to stale or unavailable objects.

In particular embodiments, distribution elements of the present invention can be interfaced with CORBA compliant infrastructures or systems. This standards based approach eliminates the need to comply with proprietary interfaces. Further, by providing for operation in conjunction with existing software services, the present invention provides a non-intrusive approach to object distribution and load balancing.

An embodiment of a system according to the present invention provides for distributing access to objects, where the objects reside on one or more computers attached to a network. The system includes a computer in communication with a network. The computer incorporates a client program, a distributor program, and at least two object proxies. The object proxies are associated with objects resident on servers attached to the network. Various of the objects are grouped into object groups comprising objects which perform similar functions. The distributor program selects between objects within an object group to perform functions for the client program.

Another embodiment of a system according to the present invention provides for controlling load distribution during access to objects resident on a plurality of computers attached to a communication network. The system includes a client computer including a client program and attached to the network. The system further includes a first server including a first object and a second server including a second object, where both the first and the second servers are attached to the communication network. A distributor program receives requests for a function provided by the first and second objects and selects one of the first and the second objects to perform the function for the client program.

An embodiment of a method according to the present invention provides for balancing object and/or server loads across a communication network. The method includes receiving a request for a function from a requesting program; selecting an object to provide the function, such that the selection involves distributing requests for the function across a plurality of objects providing the function; and providing a reference to the selected object to the requesting program, where the requesting program can access the selected object to perform the function using the reference.

These and other embodiments of the present invention are described in more detail in conjunction with the text below and attached figures.

BRIEF DESCRIPTION OF THE DRAWINGS

A more complete understanding of the present invention may be derived by referring to the detailed description and claims when considered in connection the figures, wherein like reference numbers refer to similar items throughout the figures, and:

DETAILED DESCRIPTION OF THE INVENTION

Figure 1:
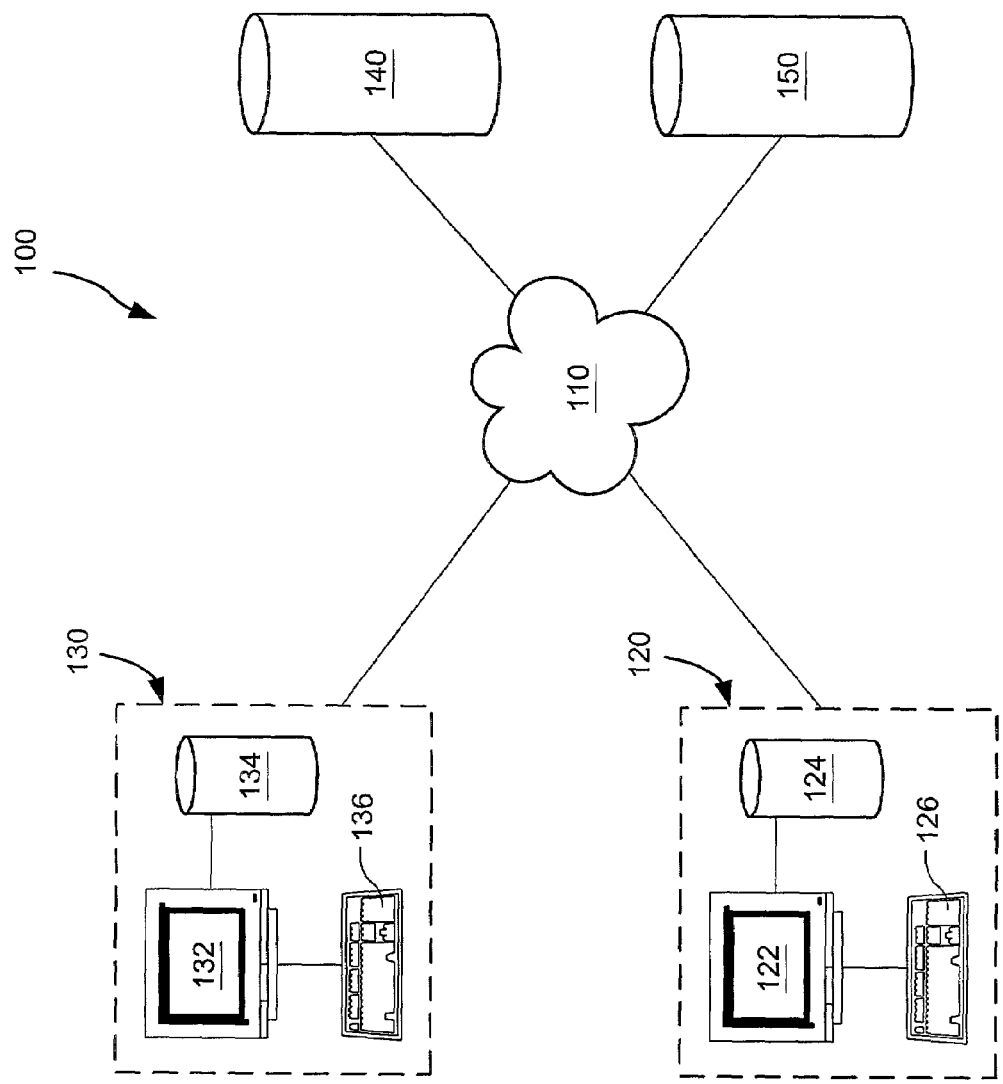
FIG. 1 illustrates a network environment that incorporates object distribution functionality according to embodiments of the present invention.

Referring to FIG. 1, a network environment 100 includes a communication network 110, clients 120 and 130, and servers 140 and 150. In some embodiments, network 110 is the Internet. In other embodiments, network 110 is a Wide Area Network. However, it will be appreciated by one of ordinary skill in the art that the present invention can be used in relation with a number of communication networks such as, for example, Local Area Networks (LAN) or Virtual Private Networks (VPN).

Servers 140, 150 can be any computer or other type of machine capable of providing access to objects across network 110. In some embodiments, servers 140, 150 are web servers capable of providing access to objects across the Internet.

Clients 120, 130 can be any computer or other type of machine capable of communicating with network 110 and executing code which requests access to objects from servers 140, 150 across network 110. In some embodiments, clients 120, 130 are personal computers. Client 120 can include a keyboard 126, a display 122 and a database 124. Similarly, client 130 can include a keyboard 136, a display 132 and a database 134. It should be recognized that clients 120, 130 can be other types of computers, such as, computers similar to servers 140, 150.

Figure 2:
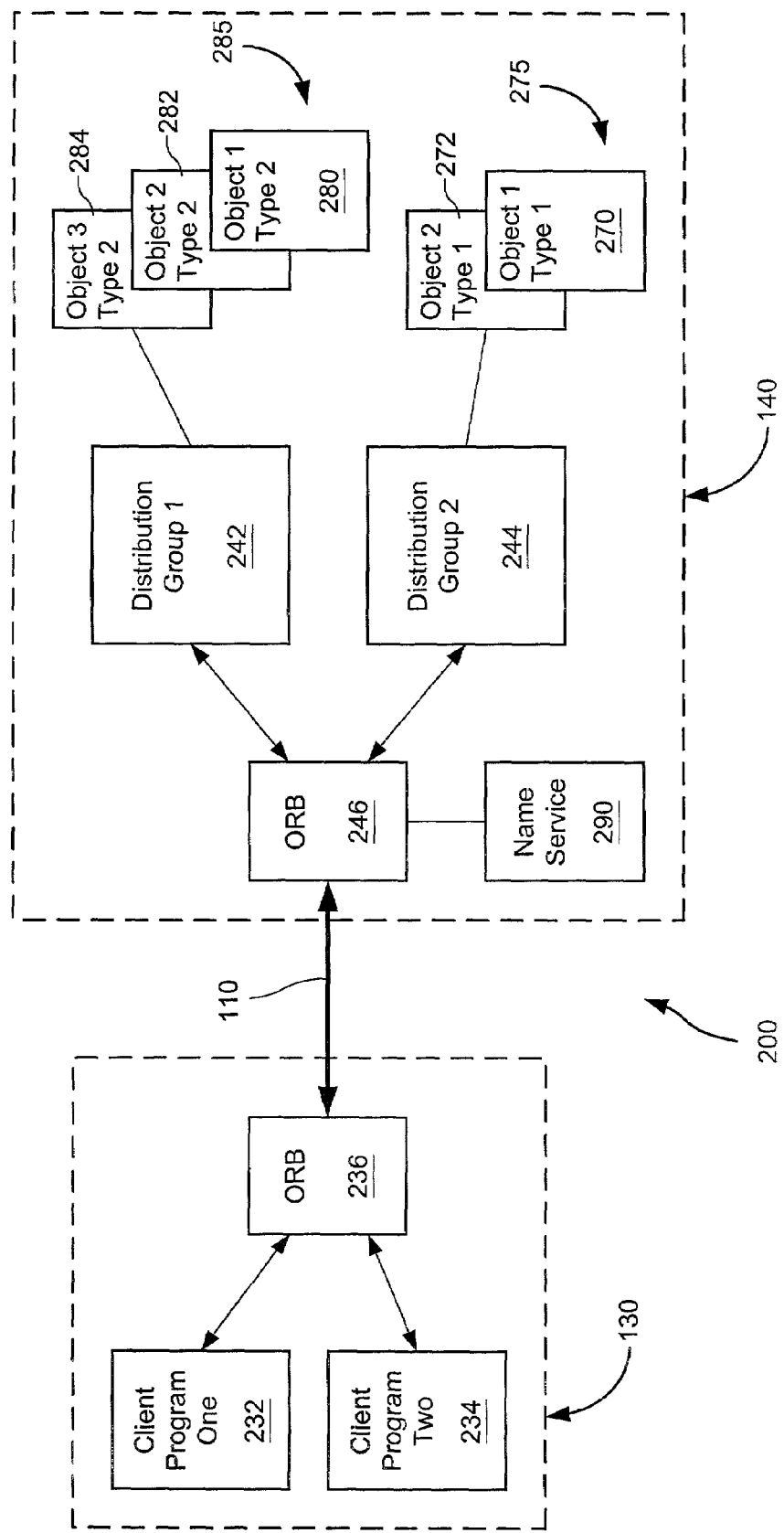
FIG. 2 illustrates a functional diagram of a client and a server including functional elements according to embodiments of the present invention.

FIG. 2 provides a functional diagram 200 of client 130 and server 140 including functional elements according to embodiments of the present invention. As illustrated, client 130 includes an ORB 236, a client program one 232, and a client program two 234. Client programs one and two 232, 234 can be any program which rely on objects resident on servers 140, 150. As an example, client program one 232 can be a program for monitoring all statistics about a patient in a hospital. As such, client program one 232 may rely on one or more objects resident on server 140 to gather and/or analyze the needed client information. Client program two 234 can perform a different function, such as, for example, logging duration of telephone calls for a particular business. As such client program two 234 may rely on objects resident on server 140 to perform its functions. It should be recognized that more or fewer than the two illustrated client programs 232, 234 can be executed by client 130 to perform any number of desired functions.

Server 140 includes an Object Request Broker (ORB) 246, distributors 242 and 244, and object groups 275 and 285. Object groups 275 and 285 include a number of objects which perform the same function. For example, type one objects 270, 272 may perform the function of monitoring a patients vital statistics and type two objects 280, 282, 284 may perform the function of monitoring telephone usage. Of course, as the preceding functions are exemplary, one of ordinary skill in the art will appreciate that many different functions may be performed by any number of object groups similar to object groups 275, 285.

Objects 270, 272, 280, 282, 284 can be any module of computer executable code. In some embodiments, objects 270, 272, 280, 282, 284 are CORBA compliant. This compliance allows for use of existing CORBA facilities in relation to the objects. Each of objects 270, 272, 280, 282, 284 performs a specified function, receives a specified input, and provides a specified output defined by an Interface Definition Language (IDL).

In some embodiments, a distributor 242, 244 is instantiated by server 140 for each object group 275, 285. Each object group 275, 285 comprises objects which use the same ID and perform the same function. Thus, each of the objects within a particular object group 275, 285 rely on a common naming context. This allows interchangeability of the objects supported by distributors 242, 244. Thus, for example, all objects 280, 282, 284 within object group 285 and supported by distributor 242 can provide an Order Service function with a common interface. In part because of this, objects within an object groups 275, 285 can be created from different computer languages. For example, object group 275 can comprise object 270 written in the "C++ and Pascal and/or Java" language and object 272 written in the "Pascal" language. Thus, the actual names and implementation of objects 280, 282, 284 can be irrelevant. For the purposes of client 130, either of objects 270, 272 can serve to implement the function represented by object group 275.

Furthermore, objects within a particular object group 275, 285 can be compiled for different operating environments. For example, object group 275 can comprise object 270 compiled for operation under 95™ and object 272 compiled for operation under UNIX. Again, for the purposes of client 130, either of objects 270, 272 can serve to implement the function represented by object group 275.

In operation, either client program one or two 232, 234 requests a remote object supporting a CORBA IDL via a ORB 236. Via ORB 246, ORB 236 identifies the desired object on network 110 and provides a proxy object in the address space of client 130. The proxy object creates an illusion that the remote object is local to client 130. When client program one or two 232, 234 calls a function of the requested object, ORB 236 sends a message to server 140 where the object is resident. The function is performed on server 140 and the results of the function are returned to ORB 236. ORB 236 converts the results to an object reply expected by client program one or two 232, 234. In some embodiments, this functionality is provided consistent with the CORBA standard. However, one of ordinary skill in the art will recognize other methods of performing the function.

As part of the operation, distributors 242, 244 act to distribute the load of function calls across objects 270, 272, 280, 282, 284 within a particular object group 275, 285.

Thus, for example, when a function supported by object group 275 is requested, distributor 244 determines which of objects 270 or 272 will perform the requested function. In some embodiments, this load distribution is performed using a round-robin algorithm. However, it should be recognized by one of ordinary skill in the art that other load balancing algorithms can be used in accordance with the present invention. Further detail of distributor operation 242, 244 is provided below.

In a typical CORBA environment, servers 140, 150 supporting objects 270, 272, 280, 282, 284 register the objects with a Naming Service (NS) 290. NS 290 can include names and locations of servers 140, 150 supporting CORBA compliant objects, as well as names of the objects themselves. Thus, NS 290 provides a mechanism whereby calling programs can determine the location of particular objects on communication network 110. In an embodiment of the present invention consistent with FIG. 2, NS 290 includes CORBA compliant objects 270, 272 listed as providing functionality of object group 275 and CORBA compliant objects 280, 282, 284 as supporting functionality of object group 285. In embodiments involving objects dispersed across multiple servers, NS 290 can include a listing of object groups 275, 285 including objects available on any or all of the other servers.

In some embodiments, distributors 242, 244 rely on NS 290 to identify and locate objects 270, 272, 280, 282, 284 on communication network 110. Thus, for example, on any given network, there may be many objects which provide a specific function. NS 290 provides a list of all such objects along with their locations. Distributors 242, 244 can make calls to NS 290 to query the identity and location of objects supported by the particular distributor 242, 244. In some embodiments, calls by distributors 242, 244 to NS 290 are CORBA compliant. From this query, distributors 242, 244 can assemble object group 275, 285, which includes objects 270, 272, 280, 282, 284 that perform the function supported by distributor 242 or 244.

Diagram 200 illustrates what can be a centralized approach of load distribution. In such a centralized approach, all objects can be accessed via ORB 246 and identified by NS 290. Distributor 244 is responsible for allocating access to all objects within object group 275, regardless of where the object resides on communication network 100 (i.e. on server 140 or any other server on communication network 110). Similarly, distributor 242 is responsible for allocating access to all objects within object group 285, regardless of where the object resides on communication network 100.

Such a centralized approach involves instantiation of distributor 242, 244 only on a single server 240, which simplifies access and development. In some instances, however, a centralized approach exhibits various drawbacks. For example, if distributor 242, 244 fails or is otherwise unavailable, access to the load distribution features of the present invention can be limited. Furthermore, unavailability of distributor 242, 244 can be more frequent because distributor 242, 244 becomes a bottleneck for accessing objects 270, 272, 280, 282, 284.

Figure 3A:
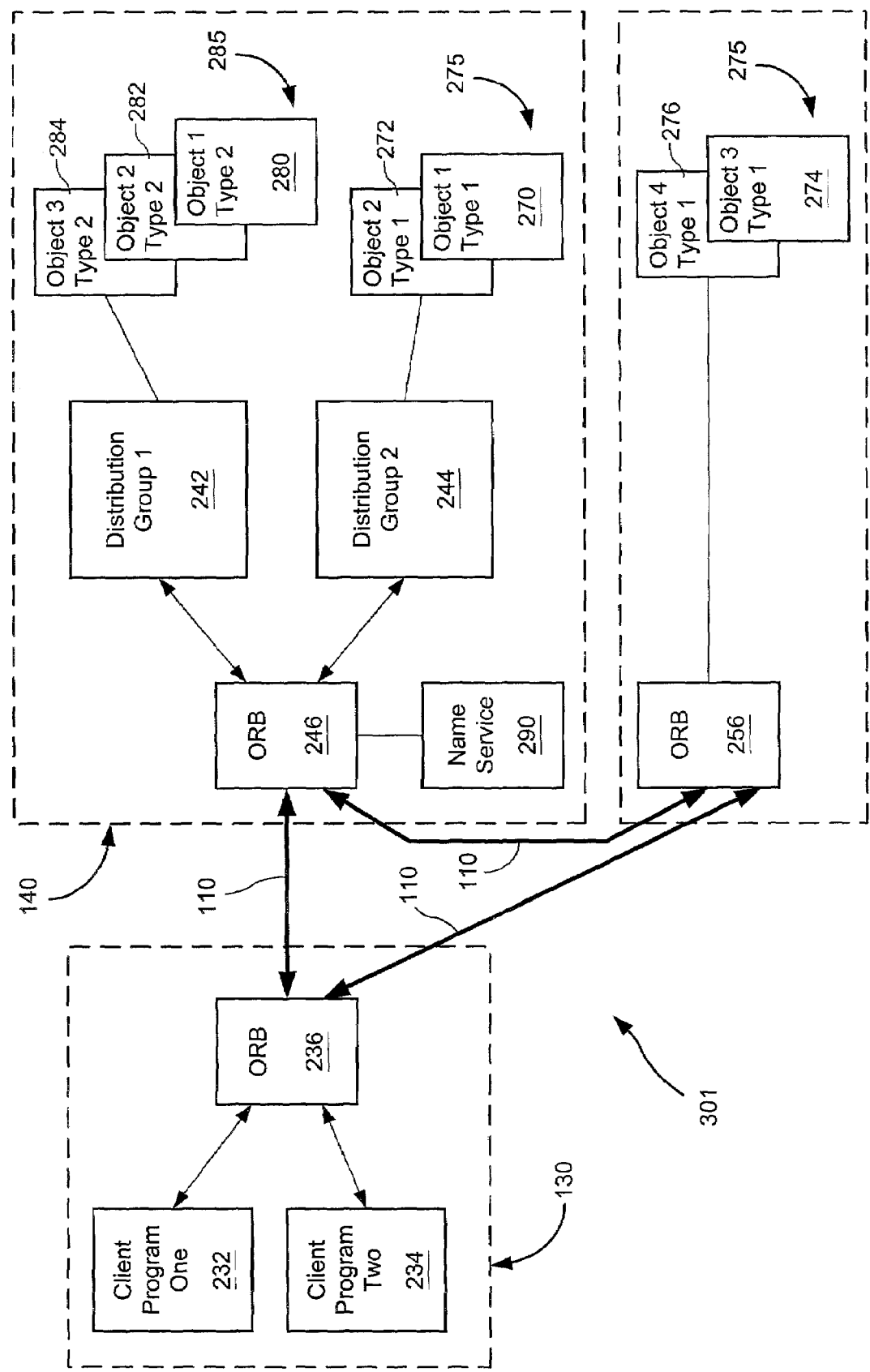
FIG. 3A illustrates an embodiment of the functional diagram of FIG. 2.

FIG. 3A illustrates a functional diagram 301, which is an expanded version of diagram 200 in accordance with another embodiment of the present invention. This embodiment illustrates one approach to implementing central distribution with distributors 242 and 244. As illustrated, functional diagram 301 includes server 150 in communication with both client 130 and server 140 across network 110. Server 150 includes an ORB 256 and objects 274, 276 incorporated in object group 275. Each of the elements in server 150 is similar to those described in relation to server 140.

Distributor 244 controls access to object group 275, which comprises objects 270, 272, 274, 276. Thus, when a request for an object from object group 275 is received, distributor 244 can refer the requester to a particular object from one of objects 270, 272, 274, 276 resident on either server 140 or server 150. Once referred, client 130 can request the particular object directly from server 140 or 150 depending upon the location of the particular object. As illustrated, this embodiment is supported by a single distributor 244 for object group 275. Thus, distributor 244 need only be instantiated on a single server 140 and implemented in a single programming language for operation in only one operating environment provided on server 140.

Figure 3B:
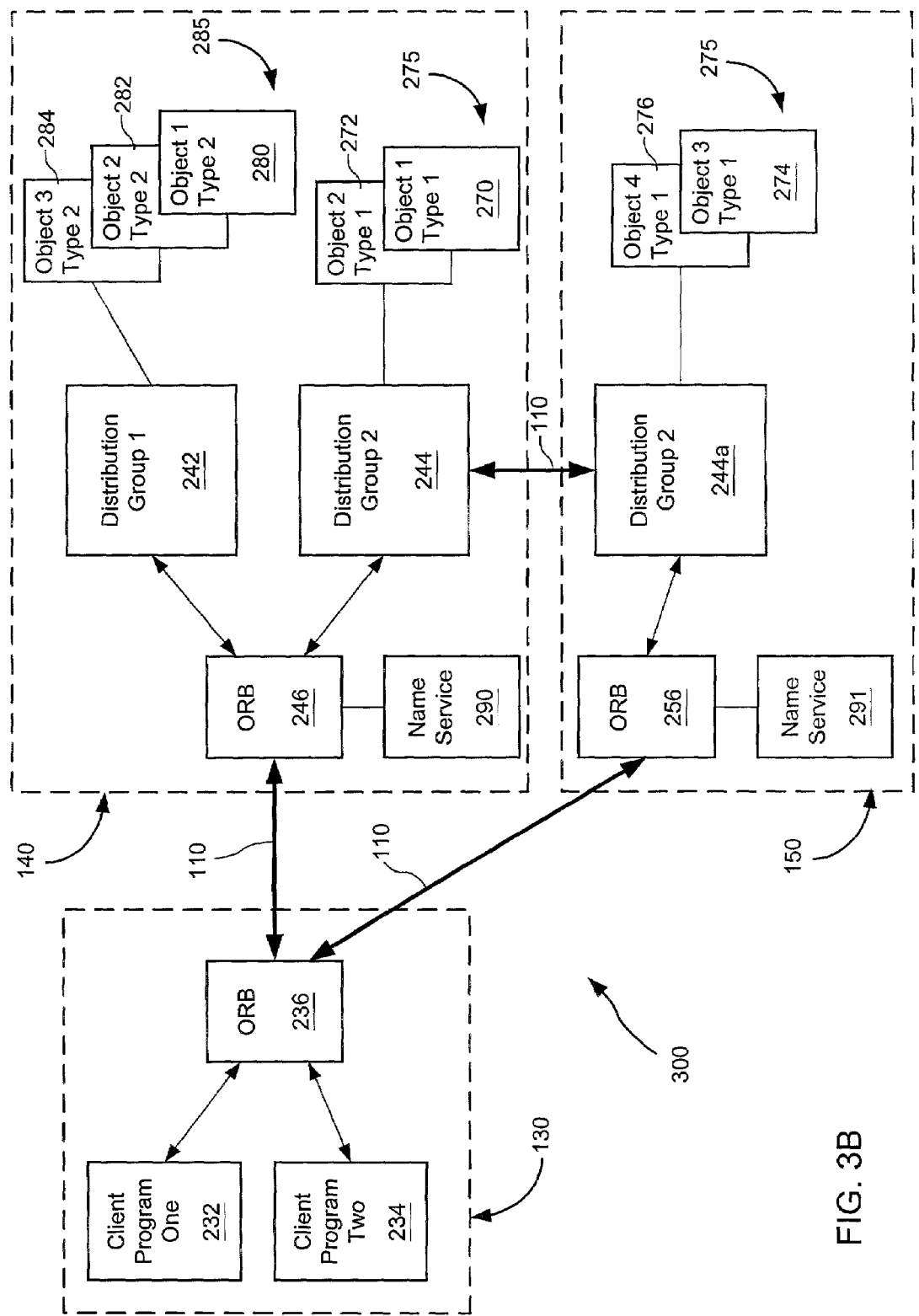
FIG. 3B illustrates another embodiment of the functional diagram of FIG. 2.

FIG. 3B illustrates a functional diagram 300, which is an expanded version of diagram 200 in accordance with another embodiment of the present invention. As illustrated, functional diagram 300 includes server 150 in communication with both client 130 and server 140 across network 110. Server 150 includes ORB 256, an NS 291, a distributor 244a, and objects 274, 276 incorporated in object group 275. Each of the elements in server 150 is similar to those described in relation to server 140.

Distributor 244a is a mirror of distributor 244 and is responsible for allocating access to any objects 270, 272, 274, 276 within object group 275. Thus, in this embodiment, client 130 requests an object providing the functionality represented by object group 275 via either ORB 256 resident on server 150 or ORB 246 resident on server 140. If this request is made via ORB 246, distributor 244 selects one of objects 270, 272, 274, 276 to perform the requested function. Alternatively, if client 130 makes the request via ORB 256, distributor 244a is responsible for selecting one of objects 270, 272, 274, 276 to perform the function for client 130.

By creating mirror distributor 244a functional on server 150, access to object group 275 is available when distributor 244 is unavailable. Furthermore, a bottleneck does not exist through distributor 244 to access object group 275. In some instances, this approach can involve generation of distributors 242, 244 in different programming languages and/or for different operating environments depending on the languages and operating environments provided on servers 140, 150 where distributors 242, 244, 244a will be instantiated. For example, distributor 244 may be written in the "C plus-plus" language and distributor 244a is written in the "java" language. Further, some overlap of functionality between distributor 244 and distributor 244a occurs including, for example, maintaining knowledge of all objects 270, 272, 274, 276 within object group 275. The aforementioned factors can result in a more complex runtime environment. Thus, as will be appreciated by one of ordinary skill in the art, both centralized and distributed embodiments of the present invention are possible depending on the desired results of the application.

Further, it should be recognized that NS 290 and NS 291 can provide duplicated functionality. Thus, in some embodiments, both NS 290 and NS 291 provide a list of all objects available on communication network 110. In such embodiments, where either NS 290 or NS 291 becomes non-functional, the other NS can be relied upon to identify objects on communication network 110. In alternate embodiments, NS 290 only lists objects available on server 140 and NS 291 only lists objects available on server 150. In such embodiments, distributors 242, 244 are responsible for querying both NS 290 and NS 291 to assemble object groups 275, 285. In yet other embodiments, NS 290 and NS 291 are hierarchical where, for example, NS 290 provides a list of all objects 270, 272, 274, 276, 280, 282, 284 on communication network 110 and NS 291 lists only objects 274, 276 resident on server 150. In such embodiments, NS 290 can rely on NS 291 to identify all objects on server 150.

Figure 4:
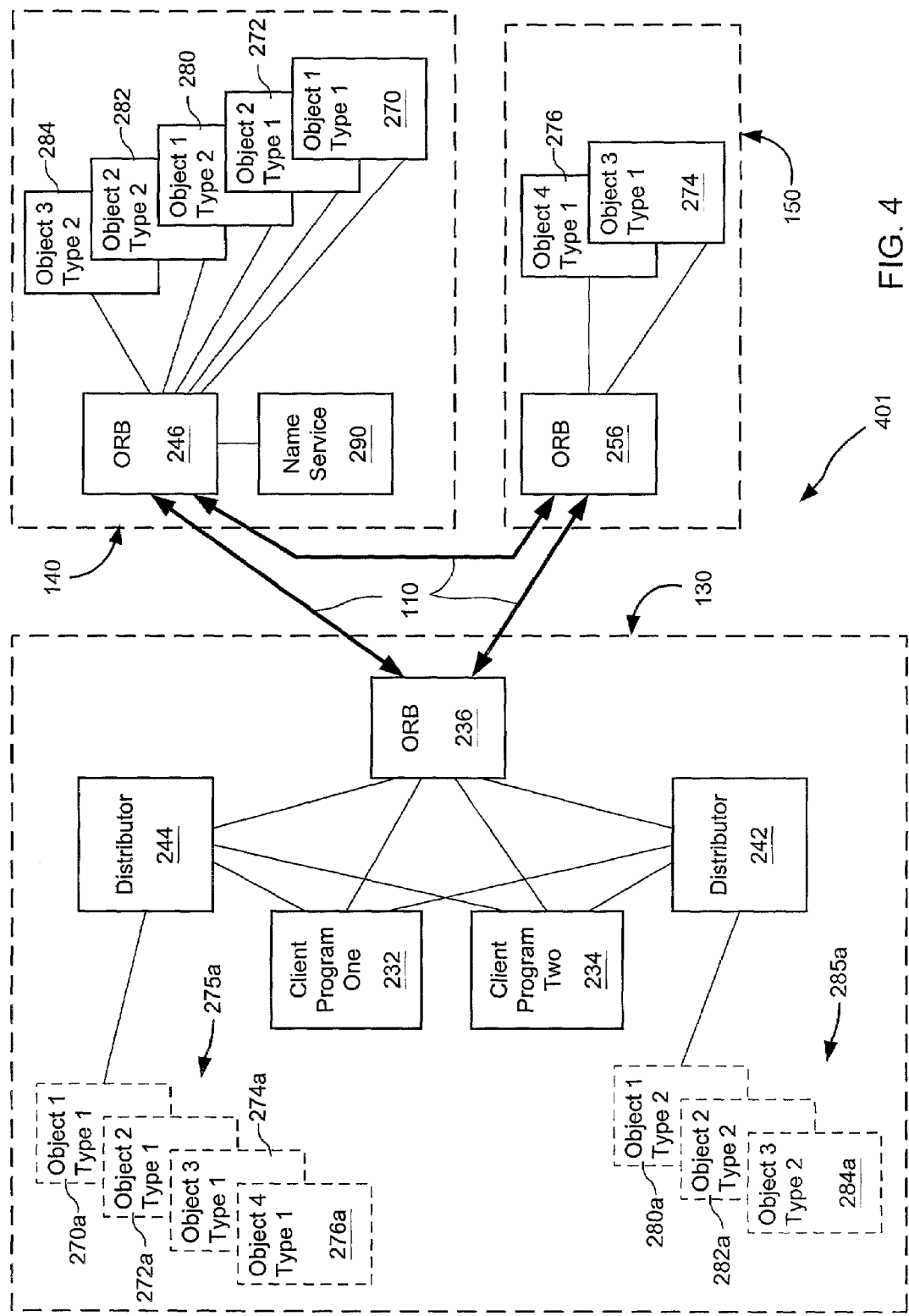
FIG. 4 illustrates a functional diagram of a client including distributors instantiated thereon according to the present invention and attached to two servers each incorporating objects.

Another embodiment of the present invention-is illustrated as a functional diagram 401 in FIG. 4. Diagram 401 includes client 130 and servers 140, 150 connected via network 110. Server 140 includes NS 290, ORB 246, and objects 270, 272, 280, 282, 284. Server 150 includes ORB 256 and objects 274 and 276. Objects 280, 282 and 284 perform the same function and share a common IDL. Similarly, objects 270, 272, 274 and 276 perform the same function and share a common IDL.

Client 130 includes ORB 236, distributors 242, 244, client programs 232, 234, and object proxies 270a, 272a, 274a, 276a, 280a, 282a, 284a. Similar to groupings of objects 270, 272, 274, 276, 280, 282, 284 described with reference to FIGS. 2–3, object proxies 270a, 272a, 274a, 276a, 280a, 282a, 284a are grouped into object groups 275a, 285a to include object proxies which share a common IDL and perform similar functions.

To client programs 232, 234, object proxies 270a, 272a, 274a, 276a, 280a, 282a, 284a appear to be the objects they represent. Thus, for example, client program 232 requesting the functionality provided by objects represented as object group 275, can issue a call to object proxy 270a. As far as client program 232 is concerned, object 270 represented as object proxy 270a is local to client 130. In fact, object proxy 270a is merely a shell incorporating a reference to object 270 on server 140. The same is true for the other object proxies.

In operation, either client program one or two 232, 234 makes a requests for a particular function supported by one of object group 275a, 285a. Depending upon which object group 275a, 285a supports the requested function, the request is directed to either distributor 242 or 244. Thus, for example, if the request is for a function supported by object group 275a, distributor 244 would allocate which object 270, 272, 274, 276 will be accessed to provide the desired function.

In some embodiments, distributors 242, 244 access NS 290 to identify and locate objects supported by the object group 275, 285 represented by the particular distributor 242, 244. Thus, for example, when distributor 244 is instantiated on client 130, it queries NS 290 to identify and locate all objects performing the function represented by object group 275. From this query, distributor 244 instantiates object proxies 270a, 272a, 274a and 276a. Included with instantiating object proxies 270a, 272a, 274a, 276a, distributor 244 assembles a list indicating the location of objects 270, 272, 274, 276 corresponding to the object proxies 270a, 272a, 274a, 276a. Thus, when client program 232, 234 requests a function from object proxy group 275a, distributor 244 returns a reference to a particular object 270, 272, 274, 276 from object group. 275. The reference includes an indication of which server the referenced object resides on. Client program 232, 234 can then access the particular object from the server where it resides.

The embodiment illustrated in diagram 401 is decentralized. Such a decentralized approach avoids bottlenecks without compromising functionality of distributors 242, 244. Thus, failure of client 130 does not result in the inability of other clients to access objects via distributors 242, 244. In such embodiments, the routing intelligence for selection of a specific object to perform a desired function is embedded in distributors 242, 244, which can exist in the same process as client programs 232, 234. In such embodiments, the failure of any distributor 242, 244 will not effect the functionality of other client programs 232, 234 and/or other clients 130 or servers 140, 150. Furthermore, a decentralized approach also provides uniform load distribution in situations where clients generate differing loads, and also when clients generate variable loads.

Figure 5:
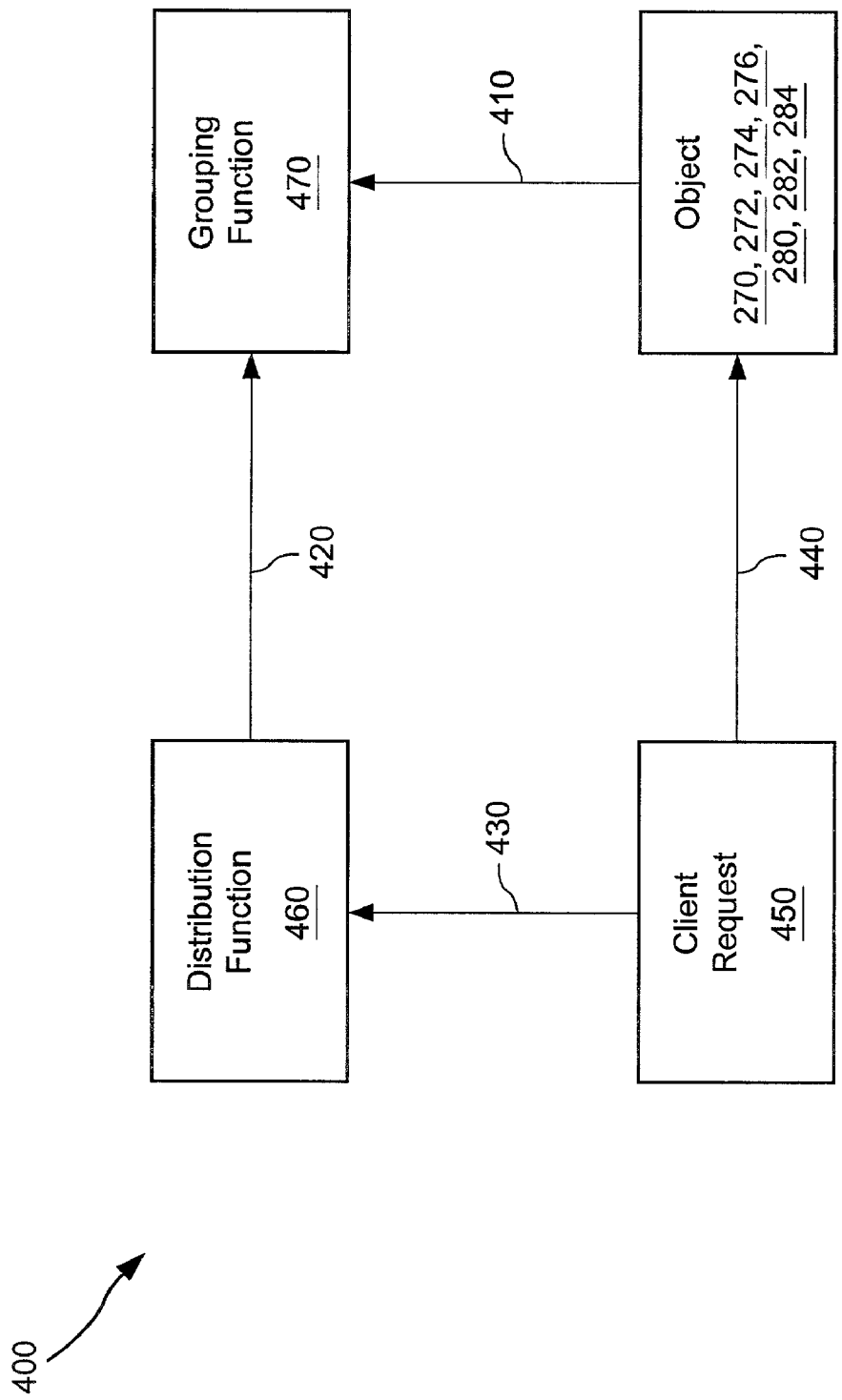
FIG. 5 is a flow diagram illustrating functionality of embodiments according to the present invention.

In operation, distributors 242, 244 can be initiated when servers 140, 150 and/or clients 120, 130 start-up. During start-up, servers 140, 150 and/or clients 120, 130, instantiate distributors 242, 244. Referring now to FIG. 5,the ongoing functionality of object distribution according to an embodiment of the present invention is described with reference to a flow diagram 400. Flow diagram 400 includes a step 410 in which objects 270, 272, 274, 276, 280, 282, 284 are grouped by grouping function 470. Grouping function 470 serves to assemble object groups 275, 285 together. Thus, for example, distributor 242 queries servers 140, 150 to determine all objects providing the functionality of object group 285 and include a common IDL. Thus, as illustrated, grouping function 470 identifies objects 280, 282, 284 for assembly into a common object group 285. Similarly, object group 275 is assembled by distributor 244. When distributor 242, 244 is instantiated, all objects supported by the particular distributor are added as children of the distributor.

In various embodiments, grouping function 470 relies on NS 290. In such embodiments, server 140 first registers objects 270, 272, 280, 282, 284 with NS 290 and server 150 registers objects 274, 276 with NS 290. Distributors 242, 244 can then identify objects for inclusion in object groups 275, 285 through accessing NS 290. Once the objects are identified by accessing NS 290, each distributor 242, 244 assembles and maintains a list of available objects. This is illustrated as a distribution function 460 performing step 420.

With object groups 275, 285 assembled by grouping function 470, client 130 can invoke functions of distributors 242 and/or 244 in step 430. Functions of distributors 242, 244 are accessed via an Application Programming Interface (API) that defines access to distributors 242, 244. In step 430, client 130, at the request of one of the client programs 232, 234, requests the functionality of an object from distributor 242, 244 overseeing an object group 275, 285, which includes objects to support the desired-functionality.

The request is executed by the distributor 242, 244 by returning a reference to client program 232, 234 for a particular object that performs the desired function. Distributor 242, 244 selects a particular object to perform the requested function. Client requests are distributed across objects 270, 272, 274 and 276 by distributor 244 and across objects 280, 282, 284 by distributor 242. To do this, each of distributors 242, 244 rotate access to the various objects. Such rotation can be based on a round robin or other distribution algorithm. In some embodiments, the distribution algorithm accounts for the amount of processing required by a particular object in an effort to evenly distribute requests on communication network 110. Other distribution algorithms include random with uniform distribution and random with Gaussian distribution.

As will be appreciated, distributors provide a parallel naming service such that if NS 290 becomes unavailable, client 130 is not affected since distributors 242, 244 are capable of providing references to objects 270, 272, 274, 276, 280, 282, 284.

In some embodiments, distributors 242, 244 maintain a memory cache listing objects and their availability. This cache is periodically refreshed to assure that a complete object listing is up to date. When a cache is refreshed, distributors 242, 244 obtain a new list of objects 270, 272, 274, 276, 280, 282, 284 from NS 290. In this way, objects recently registered with NS 290 become available for distribution by distributors 242, 244. In addition, objects which have been unregistered and are now unavailable are removed from the cache and references to the removed objects are no longer provided as references to client programs 232, 234 by distributors 242, 244.

Also, in some embodiments, either as part of a cache refresh or as a stand alone process, distributors 242, 244 validate objects included within object groups 275, 285, which are supported by the respective distributor. The objects 270, 272, 274, 276, 280, 282, 284 can be validated by pinging an ORB 246 associated with the server 140, 150 where the object is resident. In this way, distributors 242, 244 can eliminate any objects 270, 272, 274, 276, 280, 282, 284 that might be registered in NS 290, but that are not actually available. Such validation can be performed at a set time interval, which in some embodiments is user definable, or validation can occur based on a particular event, such as, for example, in response to trigger from a user or client program 232, 234. Thus, if one or more objects 270, 272, 274, 276, 280, 282, 284 becomes unavailable, distributors 242, 244 can automatically stop providing references to the unavailable object to client 130. This shields client 130 from otherwise unavoidable failures. It should be recognized that other tests can be performed to determine the functionality of a particular object. For example, a resource health test, load check, or traceroute test can be used according to the present invention.

In one particular embodiment, distributor 242, 244 makes a call to org.omg.CORBA.Object._non_existent( ) to determine if the object exists and is available to handle requests. If the object is not available, reference to the unavailable object is automatically eliminated from the cache. This prevents distributors 242, 244 from providing references to unavailable objects to requesting clients. By updating the cache in this way, damage related to an object becoming unavailable is reduced and even eliminated.

Where it is detected that NS 290 is no longer available, cache refreshes can be stopped. Additionally, it should be recognized by one of ordinary skill in the art that a number of cache and cache update schemes are possible. For example, to minimize the network traffic generated by distributors 242, 244, the cache refresh interval can be increased. Conversely, where the Mean Time Between Failure (MTBF) of objects 270, 272, 280, 282, 284, or servers 140, 150 providing the objects is low, the cache update interval can be reduced to avoid providing references to unavailable objects. Alternatively, where the MTBF is high, and the number of clients is large, the refresh interval can be higher. Additional factors impacting cache refresh can include the number of clients, the number of objects accessed by the clients, and the fault resilience expected by clients 120, 130.

In some embodiments, distributor 242, 244 is responsible for distributing multiple groups of objects. In other embodiments, distributor 242, 244 is only responsible for distributing a single group of objects. In such embodiments, several groups of objects can be distributed by a distributor 242, 244 which is instantiated for each particular object group. In this way, the complexity of distributor 242, 244 can be reduced and the amount of memory and code involved in producing the distributor is minimized.

Objects can be requested from a distributor 242, 244 as often as desired. For coarse grained distribution balancing, client 130 can get an object once, and then use the same object for the entire session. For fine grained distribution balancing across a set of stateless objects, a new object can be obtained every time a method is invoked on the service. A fine grain is defined as breaking down a work load into finer components. To illustrate, in the CORBA context, breaking down a load down to the operation invocation level is fine grained because that is the lowest level at which the load can be distributed. A slightly coarser grained approach would be to break it down to the transaction level. Transactions typically are a group of operations. Thus, chunks of operations are distributed instead of single operations. Finally, an even coarser grain load distribution would be to distribute load at the session level. A session is all the operations that a client invokes from the beginning of a session to the end of a session, and all the operations invoked in a session lasting potentially hours is treated as one chunk. This could amount to a pretty big chunk, but distributing a load in such big chunks is oftentimes more useful than not load balancing at all.

Stateful is defined as some state information on the object which is used across invocations. An example is a shopping cart object. If a customer adds something to their shopping cart, and then adds something again, they would like to be using the same cart across the two add operations. If the customer gets a new shopping cart each time, then the cart is fairly useless. The same concept applies to CORBA objects. If an operation is first invoked on an object, it is desired at the next invocation, a communication to the same object that was made previously. Even if there are two objects exposing the same CORBA IDL interface, the same object is desired each time. Accordingly, this is an example of a stateful situation. On the contrary, in a stateless service, it does not matter which specific object communication is made from invocation to invocation. For instance, an operation such as getCurrentInterestRate is typically stateless, since it can be called one object, and invoked on a different object the next time without any significance. Thus, if the server object is stateful, an object can be obtained and used for invocation of a series of functions that constitute a transaction. After the completion of a transaction, a new object can be obtained for a subsequent transaction.

Some embodiments of the present invention do not assume that all clients generate equal loads on a server. In such embodiments, distributors 242, 244 account for the number of accesses to a particular server, not just the number of accesses to a particular object. Using this information, distributors 242, 244 can distribute a load from client 130 across multiple servers. Where distributors 242, 244 located across multiple clients 130 each distribute their load across multiple servers, the net effect is a balance of loads across servers on network 110.

Figure 6:
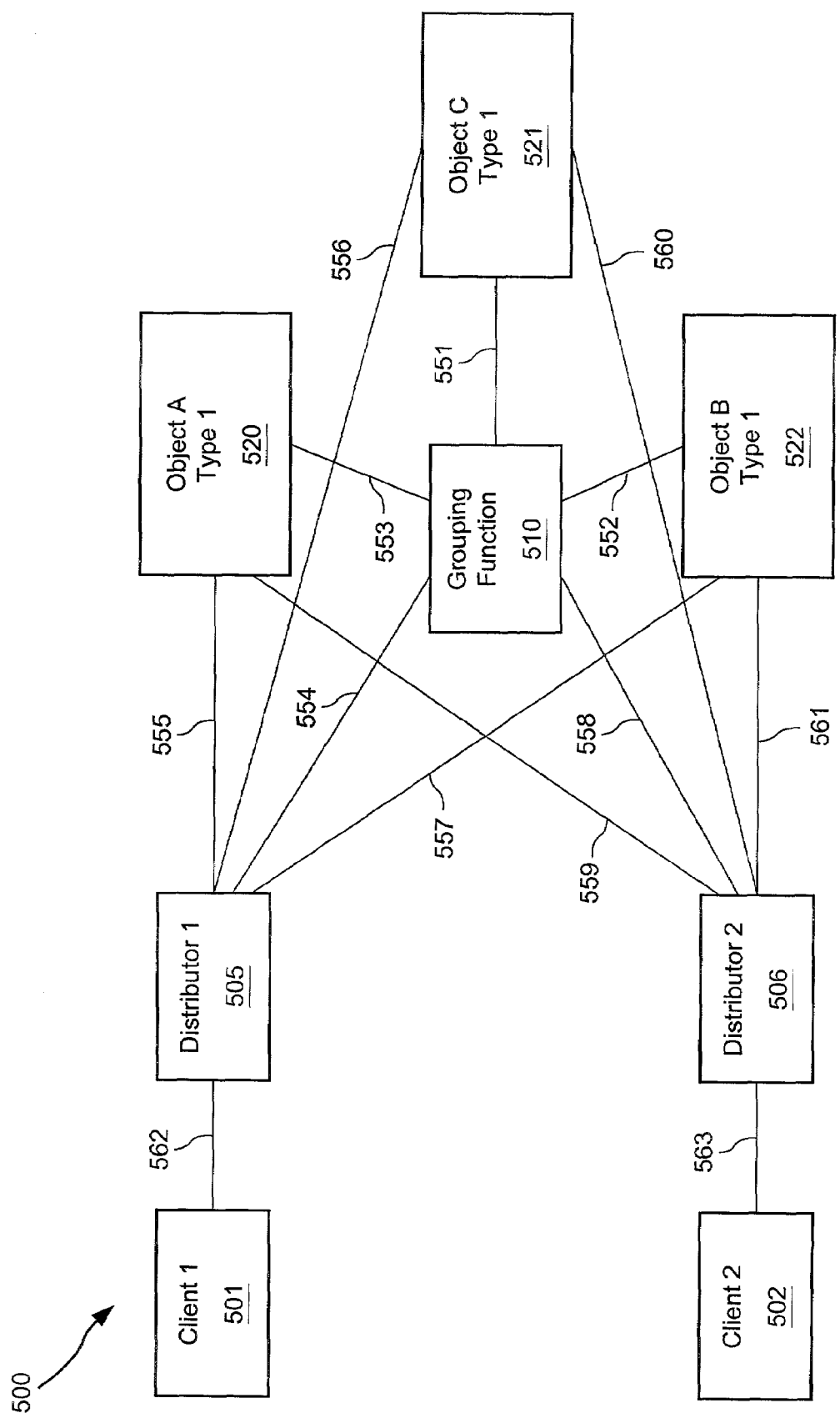
FIG. 6 is a collaboration diagram illustrating the functionality of an embodiment of the present invention.

FIG. 6 illustrates a collaboration diagram 500 illustrating the functionality of an embodiment of the present invention including distributors 505, 506 each associated with different clients 501, 502, respectively. Diagram 500 includes three objects 520, 521, 522 from an object group providing type one functionality. Objects 520, 521, 522 can be resident on different servers 140, 150 or on a common server 140, 150. Each of objects 520, 521, 522 are registered with NS 290. Client 501 and client 502 are two independent clients that instantiate their own distributors 505, 506, respectively, to distribute access to objects 520, 521, 522 providing type one functionality. Each distributor 505, 506 obtains and caches references to all objects 520, 521, 522. In addition, distributors 505, 506 pings each of objects 520, 521, 522 to determine if they are available and operational. Clients 501, 502 can obtain references from distributors 505, 506 to one of objects 520, 521, 522 by requesting functionality common to objects 520, 521, 522. In some embodiments, distributors 505, 506 automatically refresh its cache after a request for an object. This refresh can be transparent to client 501, 502. In other embodiments, a refresh interval can be provided such that distributor 505, 506 refreshes its cache at a particular time interval unrelated to a request for an object.

There can be two or more types of refreshes performed when distributors 505, 506 refresh their caches. One refresh type updates object identities from NS 290. Another refresh type involves examining each object 520, 521, 522 to determine if the object is available and functional. In some embodiments, this second type of refresh is done by pinging objects 520, 521, 522. In other embodiments, this type of refresh is done by writing a particular message to the object and waiting for a returned message from the object. It should be recognized by one of ordinary skill in the art that a number of methods can be used to determine if an object is functional.

As illustrated in FIG. 6, in steps 554, 558, a grouping function 510 is performed by each of distributors 505, 506. Grouping function 510 involves locating and identifying objects 520, 521, 522 providing type one functionality (steps 551, 552, 553) and assembling references to each of the identified objects. The assembled references to objects 520, 521, 522 are maintained in caches associated with distributors 505, 506. In steps 555, 556, 557, distributor 505 updates its cache by pinging, or otherwise determining the availability of objects 520, 521, 522. Similarly, in steps 559, 560, 561, distributor 506 updates its cache by individually determining the availability of objects 520, 521, 522. In steps 562, 563, clients 501, 502 request functionality from objects 520, 521, 522.

From the foregoing one of skill in the art will appreciate many advantages of the present invention. As some examples, the present invention provides uniform load distribution including coarse and fine grain load balancing and local caching of object references which provides for increased performance. In some embodiments, the present invention can be interfaced with CORBA compliant structures. This standards based approach eliminates the need to comply with proprietary interfaces. The present invention also provides for fault tolerance. Yet further, the present invention offers a non-intrusive approach to object distribution and load balancing as the present invention can be used in conjunction with existing software services. The present invention also offers a dynamic approach to object distribution where stale or unavailable objects are periodically purged from caches and therefore no longer distributed.

A number of variations and modifications of the invention can also be used. For example, the distributors can be resident only on client machines, only on servers, or on a combination of servers and clients. Thus, although the invention is described with reference to specific embodiments thereof, the embodiments are merely illustrative, and not limiting, of the invention, the scope of which is to be determined solely by the appended claims.

What is claimed is:

1. An object distribution system for distributing access to group of objects, wherein the objects reside on one or more computers attached to a network, the system comprising:
 a first computer in communication with the network; wherein the first computer comprises:
  a client program;
  a distributor program;
  a first object proxy, wherein the first object proxy is associated with a first object resident on a second computer in communication with the network; and
  a second object proxy, wherein the second object proxy is associated with a second object resident on the second computer;
 wherein the first object and the second object are part of an object group comprising a plurality of objects, each of the plurality of objects being configured to perform a particular function, such that the first object, which is associated with the first object proxy, and the second object, which is associated with the second object proxy, perform the same function; and
 wherein the distributor program selects between the first and the second objects, based on a round robin algorithm, to perform the function for the client program;
 wherein the distributor program selects the first object to perform the function for the client program only when the first object is available; and
 an object request broker in communication with the first computer via the network and configured to send a message to the second computer, the message being related to the function.

2. The system of claim 1, wherein the first and the second object proxies are maintained in a cache associated with the distributor program.

3. The system of claim 2, wherein the distributor program checks to determine if the first object is available.

4. The system of claim 1, wherein the distributor program identifies the first and the second objects as providing the function and associates the first and the second objects in an object group.

5. The system of claim 6, wherein the distributor program identifies the first and the second objects using a naming service.

6. The system of claim 1, wherein the first and the second objects are CORBA compliant.

7. The system of claim 1, wherein the distributor program provides for both fine and coarse balancing of object distribution.

8. The system of claim 1 wherein the object request broker resides on the first computer.

9. An object distribution system for controlling load distribution during access to group of objects resident on one or a plurality of computers attached to a communication network, the system comprising:
 a client computer attached to the network, wherein a client program is resident on the client computer;
 a first server attached to the network, wherein a first object is resident on the first server;
 a second server attached to the network, wherein a second object is resident on the second server, and wherein the first and the second objects are part of an object group comprising a plurality of objects, each of the plurality of objects being configured to perform a particular function, such that the first object, which is associated with a first object proxy on the client computer, and the second object, which is associated with a second object proxy on the client computer, perform the same function; and
 an object request broker configured to pass requests via the network selected object from the client program;
 wherein the client computer comprises:

a first object proxy associated with the first object;
a second object proxy associated with the second object; and
a distributor program for receiving requests and for selecting between the first and the second objects, based on a round robin algorithm to perform the function for the client program, wherein the requests are passed from the client program; and
wherein the distributor program selects the first object to perform the function for the client program only when the first object is available.

10. The system of claim 9, wherein the distributor program balances access between the first and the second objects.

11. The system of claim 10, wherein the distributor function balances loading across the first and the second servers.

12. The system of claim 9, wherein the distributor program identifies the first and the second objects as providing the function and associates the first and the second objects in an object group.

13. The system of claim 12, wherein the distributor program identifies the first and the second objects using a naming service.

14. The system of claim 9, wherein the first and the second objects are CORBA compliant.

15. The system of claim 9, wherein the distributor program provides for both fine and coarse balancing of object distribution.

16. A computer-implemented method for balancing object and/or server loads across a communication network, wherein the method comprises;
receiving at a client computer a request for a function from a requesting program resident on the client computer;
selecting, with a distributor program resident on the client computer and based on a selection algorithm, an object to provide the function, wherein the selection involves distributing requests for the function across a plurality of objects that are part of an object group, each of the plurality of objects in the object group being configured to perform a particular function, such that each of the plurality of objects performs the same function; and
providing with an object request broker a reference to the selected object to the requesting program, wherein the requesting program can access the selected object to perform the function using the reference;
wherein the plurality of objects comprises a first object and a second object, and the client computer comprises a first proxy object associated with the first object and a second proxy object associated with the second object;
wherein the client computer is a first computer and the selected object is resident on a second computer;
wherein the function is performed on the second computer and the results of the function are communicated to the requesting program; and
wherein the distributor checks each of the objects in the object group to determine if the objects are available.

17. The method of claim 16, wherein the distributor program selects an object to perform the function from a group of objects which perform the function.

18. The method of claim 17, wherein the distributor identifies objects which perform the function and associates the objects in the group of objects.

19. The method of claim 18, wherein the distributor queries a CORBA compliant naming service to identify the objects that perform the function.

* * * * *

UNITED STATES PATENT AND TRADEMARK OFFICE
CERTIFICATE OF CORRECTION

PATENT NO. : 7,043,731 B2
APPLICATION NO. : 09/905384
DATED : May 9, 2006
INVENTOR(S) : Ramaswamy Page 1 of 1

It is certified that error appears in the above-identified patent and that said Letters Patent is hereby corrected as shown below:

Column 9, line 36, delete "org.omg.CORBA.Object.$_{13}$ non$_{13}$ existent( )" and insert --org.omg.CORBA.Object_non_existent( )--

Column 12, claim 5, line 37, delete "6" and insert --4--

Column 13, claim 11, line 15, delete "10" and insert --9--

Signed and Sealed this

First Day of August, 2006

JON W. DUDAS
*Director of the United States Patent and Trademark Office*